(12) United States Patent
Anugu (10) Patent No.: US 9,237,077 B2
(45) Date of Patent: Jan. 12, 2016

(54) MONITORING PERSISTENT CLIENT CONNECTION STATUS IN A DISTRIBUTED SERVER ENVIRONMENT

(71) Applicant: Cellco Partnership, Basking Ridge, NJ (US)

(72) Inventor: Sabitha Anugu, Monroe Township, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 84 days.

(21) Appl. No.: 14/228,398

(22) Filed: Mar. 28, 2014

(65) Prior Publication Data
US 2014/0215062 A1    Jul. 31, 2014

Related U.S. Application Data

(62) Division of application No. 13/163,240, filed on Jun. 17, 2011, now Pat. No. 8,693,981.

(51) Int. Cl.
*H04L 12/26* (2006.01)
*H04L 29/06* (2006.01)
*H04M 3/533* (2006.01)

(52) U.S. Cl.
CPC ............ *H04L 43/04* (2013.01); *H04L 43/0811* (2013.01); *H04L 43/10* (2013.01); *H04L 65/1083* (2013.01); *H04L 65/80* (2013.01); *H04M 3/53325* (2013.01)

(58) Field of Classification Search
CPC ..... H04L 43/04; H04L 43/10; H04L 43/0811; H04L 65/1083; H04L 65/80; H04M 3/53325
See application file for complete search history.

(56) References Cited

U.S. PATENT DOCUMENTS

| | | | |
|---|---|---|---|
| 6,128,657 A | 10/2000 | Okanoya et al. | |
| 6,816,860 B2 | 11/2004 | Yamamoto | |
| 7,076,691 B1 | 7/2006 | Dobberpuhl et al. | |
| 7,130,899 B1 | 10/2006 | Bauer et al. | |
| 7,346,691 B2 | 3/2008 | Peiffer | |
| 7,697,512 B1 | 4/2010 | Allison et al. | |
| 7,903,794 B1 * | 3/2011 | Bales et al. | 379/88.11 |
| 8,024,439 B2 | 9/2011 | Nalla et al. | |
| 8,146,095 B2 | 3/2012 | Gale et al. | |
| 8,693,981 B1 * | 4/2014 | Anugu | 455/405 |
| 2004/0030533 A1 | 2/2004 | Hirose et al. | |

(Continued)

OTHER PUBLICATIONS

Office Action for U.S. Appl. No. 13/163,240, filed Jun. 17, 2011, dated Jun. 27, 2013.

(Continued)

*Primary Examiner* — Brandon Miller (57) ABSTRACT

A system monitors the status of persistent connections between a set of servers and a set of clients, and identifies any clients not having at least one active connection with a server. The monitoring system, such as a visual voicemail system, includes a monitoring server, a bind agent, and probe services running on respective servers. Upon receiving a monitoring request from the monitoring server, the bind agent requests each probe service to identify the clients having active connections with the associated servers. The bind agent forms an aggregated list of all clients having active connections with one or more of the servers and based on the aggregated list, the agent identifies any clients not having at least one active connection with a server and notifies the monitoring server of the identified clients.

20 Claims, 5 Drawing Sheets

(56) References Cited

U.S. PATENT DOCUMENTS

| | | |
|---|---|---|
| 2007/0150822 A1 | 6/2007 | Mansour et al. |
| 2010/0083032 A1 | 4/2010 | Alcorn et al. |
| 2010/0322393 A1* | 12/2010 | Jin et al. .................... 379/88.12 |
| 2011/0022812 A1 | 1/2011 | van der Linden et al. |
| 2011/0136474 A1* | 6/2011 | Ren et al. .................... 455/412.2 |
| 2011/0137980 A1 | 6/2011 | Kim et al. |

OTHER PUBLICATIONS

Office Action for U.S. Appl. No. 13/163,240, filed Jun. 17, 2011, dated Jan. 22, 2013.

* cited by examiner

MONITORING PERSISTENT CLIENT CONNECTION STATUS IN A DISTRIBUTED SERVER ENVIRONMENT

RELATED APPLICATIONS

This application is a Divisional of U.S. application Ser. No. 13/163,240, filed Jun. 17, 2011, the entire contents of which application is hereby incorporated by reference in its entirety.

BACKGROUND

In recent years, client/server network architectures have increasingly relied on distributed server environments to efficiently provide network-based services to large numbers of users. The increased use of distributed server environments, however, has produced a need for methods and systems to ensure service quality across servers and clients involved in a distributed server environment.

The traditional client/server architecture is a network architecture in which each computer or process on a network is either a client or a server. The device running the client for one process, however, may run the server for another process, and vice versa. Client/server architectures are often suitable for use in enterprise applications in which multiple clients share the resources of a server to which the clients connect. The transmission control protocol/internet protocol (TCP/IP) is a standard way for clients and servers to exchange packets of data. In client/server architectures, client and server connections can be persistent or on demand.

Figure 1:
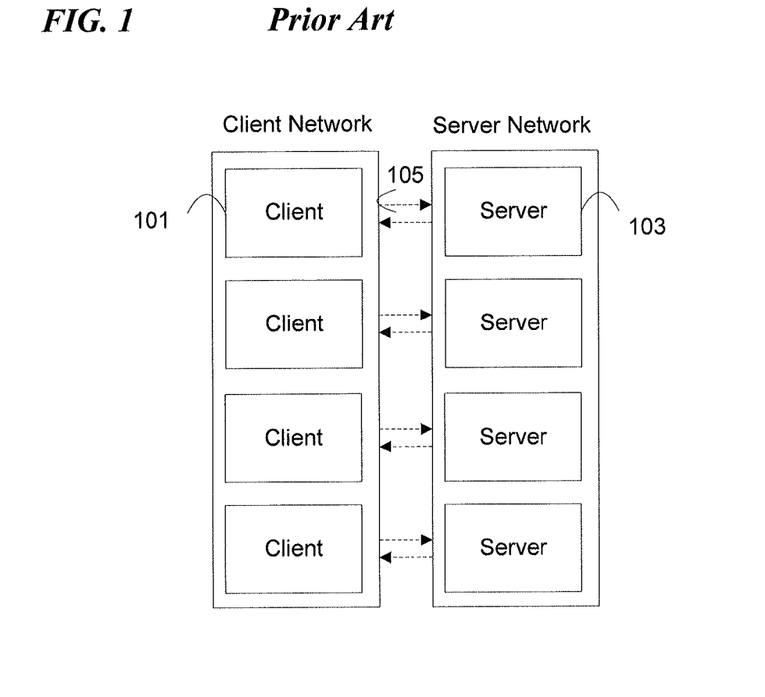
FIG. 1 is a functional block diagram showing a client/server pair having an on-demand connection.

The client/server model is based around clients connecting to a single central server or to multiple servers. The clients can send and receive messages from the server while the server maintains a global state. In the client/server model, the client opens up a channel of communication with the server and requests a service. The server receives the request, fulfills the service request, and sends the response to the client, closing the channel of communication. As illustratively shown in FIG. 1, a client (101)/server (103) pair having an isolated transaction between them can use an on-demand connection (105) to communicate. In this situation, the server does not keep open its channel of communication with the client, and the client-server pair closes the connection (105) once the isolated transaction is completed. The server further does not maintain the client connection or the requested service information associated with the isolated transaction.

Figure 2:
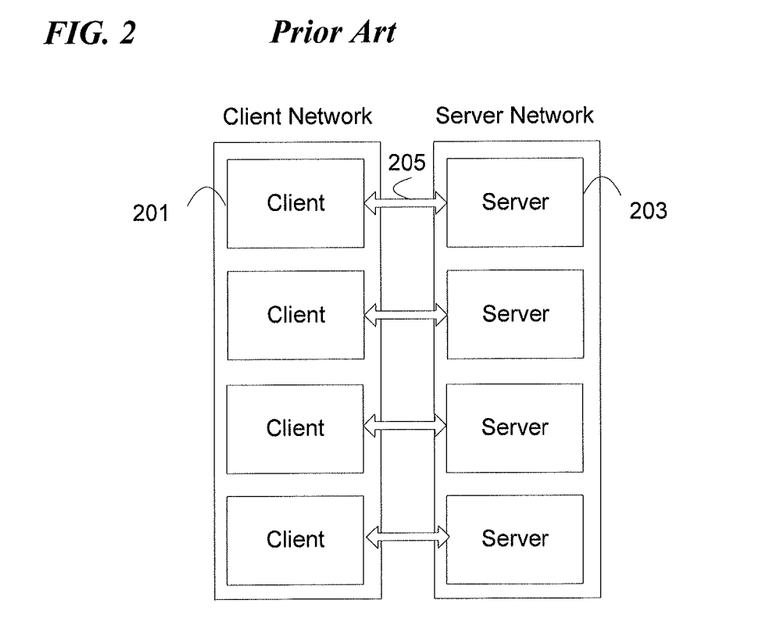
FIG. 2 is a functional block diagram showing a client/server pair having a persistent connection.

Instead of using an on-demand connection, a client/server pair can alternatively use a persistent connection to communicate with each other, as illustratively shown in FIG. 2. The TCP protocol supports a connection-oriented data transfer between two processes running on two computers on the Internet, and provides reliable two-way data exchange between processes. In order to reuse an existing connection, a short message point-to-point (SMPP) network protocol can be used to establish a persistent connection between a client and a server. A TCP/IP persistent connection (205), for example, uses the same TCP connection to send and receive multiple requests/responses between the client (201) and the server (203) of the pair, instead of opening a new connection between the client/server for every single request/response. Persistent connections allow for notable performance gains by reducing network traffic due to fewer operations of setting up and tearing down of TCP connections. Persistent client/server connections thus reduce latency on subsequent requests by removing the need for repeated initial TCP handshakes. Enabling long lasting connections also allows TCP sufficient time to determine the congestion state of the network and react appropriately to the congestion.

Distributed server environments are increasingly being relied on to provide network-based services to users. Distributed server environments are applications that provide services by using a plurality of servers across a network. Distributed server environments rely on protocols to coordinate the actions of multiple processes performed on multiple servers on a network, such that all components cooperate together to perform a single or a set of related tasks.

While the use of persistent connections and of distributed server environments each allow for performance gains in network services, they are not without problems. Persistent connections can be dropped by the client or the server using the connection, causing communication across the connection to be lost. Similarly, a server outage or dropped connection in a single server or connection of a distributed server environment can cause the distributed server environment to fail. Hence a need exists for monitoring persistent client connection status in distributed server environments to improve service reliability and to improve performance.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to the monitoring of the status of persistent client connections in multiple or distributed server environments. While the following description discusses a particular system implementation in a visual voicemail system, the teachings are not limited thereto and can more generally be applied to monitoring persistent connections in various types or applications of multiple server environments.

Reference now is made in detail to the examples illustrated in the accompanying drawings and discussed below.

Figure 3:
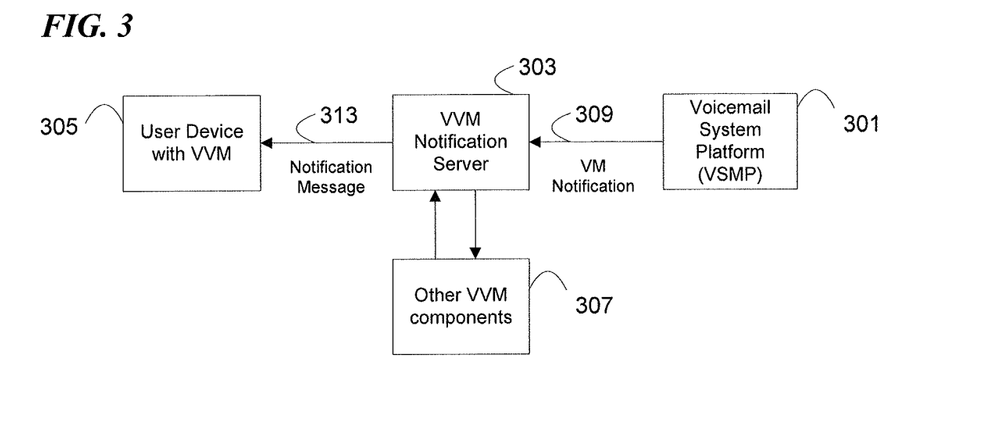
FIG. 3 is a flow diagram of signaling between a voicemail system platform and a notification server used to provide visual voicemail services to a client device.

FIG. 3 illustrates a basic flow diagram of signaling between one or more voicemail system platforms (301) and one or more notification servers (303), used to provide visual voicemail services. As discussed in more detail later, monitoring is provided for connection(s) between voicemail system platforms and notification servers in a system like that shown in the drawings. Visual Voicemail (VVM) is a user application (voicemail client) typically for a mobile device that adds a visual interface allowing a user of the device to manage voice messages received and stored in a voicemail system platform (VMSP). The VVM client application runs on a mobile station or other user device (305) and presents, on the user device, a list of messages for playback and may include a time-stamp, source or destination phone number, and in some cases a transcript of each message. The VVM client application interacts with one or more VMSPs via one or more VVM Notification Servers. The VVM Notification Server (303) is a component for notifying the VVM client application of a new voicemail message received by a VMSP, and of changes to voicemails stored in the VMSPs. The VVM Notification Server (303) serves as a gateway between the VMSPs and one or more user mobile devices.

When a VVM subscriber receives a voicemail message, the voicemail message is received by and stored on a VMSP (301). The VMSP (301) having received the voicemail message notifies a VVM Notification Server (303), which in turn communicates with several other VVM component systems (307) to deliver a voicemail notification (313) to the VVM client application running on the user device (305) of the subscriber. The example uses one of the mobile messaging services available on a public wireless network to deliver notifications to mobile type user devices. In a VVM application for mobile service, a notification with a small amount of data may be sent as a short messaging service (SMS) type message. For larger amounts of data, such as a transcript of a voicemail message, the notification may take the form of an enhanced messaging service (EMS) message or a multimedia messaging service (MMS) message. For notification purposes, the VMSP (301) functions as a client with respect to a VVM notification server (303).

As shown in FIG. 3, each VMSP (301) establishes at least one persistent connection (309) with one of a number of VVM notification servers (303). The persistent connection (309) is used to reduce the latency in notifying the user. Each VMSP (301) can open more than one connection with one or more VVM notifications servers (303) (see, e.g., FIG. 4 described further below). In examples in which the VMSP (301) and the VVM notification servers (303) communicate using SMS, EMS, or MMS messages, the VMSP (301) can establish a persistent connection with a notification server (303) using a short message point-to-point (SMPP) connection over a TCP/IP bind/connection. In such examples, the VMSPs (301) and/or the notification servers (303) can use short message service centers (SMSCs), short messaging service point-to-point (SMPP) gateways, and/or external short message entity (ESME) applications to send and receive SMS messages to each other. In other examples, the VMSP (301) and VVM notification servers (303) communicate using other suitable network connections such as persistent TCP/IP connections.

Figure 4:
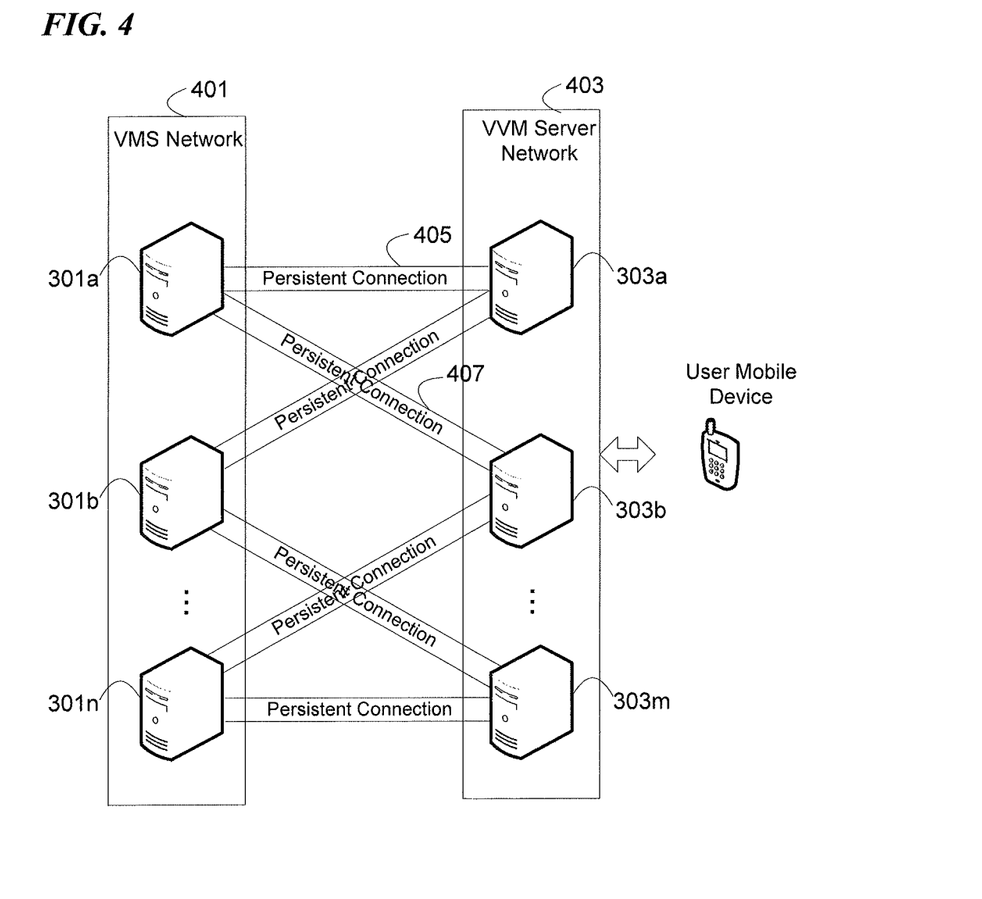
FIG. 4 is a network diagram illustrating persistent connections between servers of the visual voicemail system network and visual voicemail notification servers.

FIG. 4 shows persistent connections between servers of the VMS network (401) and a number of VVM notification servers (303a, 303b, . . . ,. 303m) of a VVM server network (403). As shown in FIG. 4, each VMSP server (301a, 301b, or 301n) can connect to one or more VVM notification servers (303a, 303b, . . . , and/or 303m), and each VVM notification server (303a, 303b, or 303m) can be connected to one or more VMSPs (301a, 301b, . . . , and/or 301n). VMS connections between VMSPs and VVM notification servers can be one-to-one, one-to-many, many-to-one, or many-to-many, which means that any number of persistent client connections can be concurrently or sequentially open to any number of servers. For every connection request transmitted from a VMSP to a VVM notification server, the VMSP sends a connection request with a system identifier (system ID) which is assigned to and uniquely identifies the VMSP. Every VVM notification server keeps a set of all the VMSP system IDs to authenticate the VMSP and open a new connection/bind. In response to the connection request received from a VMSP, the VVM notification server can allow the connection from the VMSP and notify the VMSP that the connection request is allowed. The persistent connection will then be persistent until timeout.

In general, a user mailbox resides on one of the VMSPs (301a, 301b, . . . 301n). At any time, a VMSP (301a) may establish a connection (405) to a first VVM notification server (303a), and transmit notification messages for received voicemail messages to the first notification server through the established connection (405). At any time, the VMSP (301a) may disconnect from the first VVM notification server (303a), establish a connection (407) to a different VVM notification server (303b) and, once connected to the different VVM notification server (303b), transmit notification messages for received voicemail messages to the different notification server (303b). If the VMSP is not connected to any VVM notification server, however, the VMSP will not be able to actively send notification messages such as for received voicemail messages, and notification messages may be delayed or lost. Delayed or lost messages, for example, can result in subscribers failing to be notified of received voicemails and/or of other events related to the voicemail service, leading to subscriber dissatisfaction.

Because each of the VMSPs can establish connections with any of the VVM notification servers, there is no direct way to know how many VMSPs have active connections to notification servers and how many VMSPs do not have any active connections. For example, if a VMSP disconnects from a first notification server, the first notification server does not necessarily know whether the VMSP has lost its last remaining active connection, or whether the VMSP has any remaining active connections to other VVM notification servers. If the VMSP has lost its last remaining active connection, the VMSP is not able to send notification messages to a VVM notification server until a new connection is established. However, if the VMSP has at least one remaining active connection to at least one other VVM notification server, the VMSP is still able to send notification messages to user devices through the at least one other VVM notification server. Because of the flexibility that VMSPs have in establishing connections with any of the VVM notification servers, it may therefore be difficult to promptly identify VMSPs that do not have active connections with any VVM notification server.

In addition, inadvertent or planned VVM notification server outages (e.g., for maintenance of one or more VVM notification servers) may result in a VMSP's notification messages being lost or queued if the VMSP does not have a connection with a notification server that is active and not part of the outage. Similarly, partially active connections or overloaded connections between a VMSP and a VVM notification server can result in notification or other messages transmitted between the VMSP and the notification server to be queued, timed-out, or lost, resulting in delayed or expired voicemail notifications being sent to a subscriber.

Figure 5:
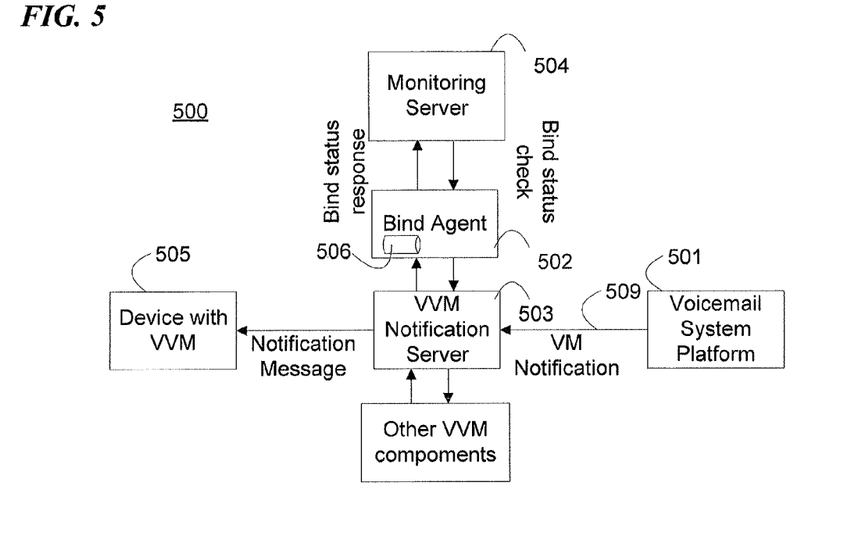
FIG. 5 is a combined network and flow diagram showing a bind agent and monitoring server for monitoring the status of persistent connections between a voicemail system platform and a notification server providing voicemail notification services.

In order to improve reliability and timeliness of delivery of voicemail notification messages between a VMSP and a VVM notification server, the status of persistent connections between the VMSP and VVM notification server is monitored, for example in order to avoid or minimize outages and delays. Hence, FIG. 5 shows a combined network and flow diagram with the monitoring. As shown, the system includes a bind agent (502) and a monitoring server (504) used to monitor the status of persistent connections between the VMSPs (501) and the VVM notification servers (503) of a voicemail system (500).

While each VVM notification server (503) can identify the VMSPs (501) with which it has active connections, the VVM notification servers (503) do not have information on VMSPs with which they do not share active connections. For example, if a VVM notification server (503) does not share an active connection with a particular VMSP (501), the notification server (503) does not know whether the particular VMSP (501) has an active connection with another notification server, or whether the particular VMSP (501) does not have an active connection with any VVM notification server. As a result, individual notification servers (503) cannot identify VMSPs (501) that do not have active connections with any VVM notification servers. In order to identify VMSPs that do not have any active connections, the bind agent (502) communicates with all of the VVM notification servers (503) of the voicemail system (500), and creates an aggregate list of all VMSPs (501) with which the notification servers (503) have active connections. The operation and signal flow of the bind agent (502) is described in more detail in connection with FIGS. 6 and 7 below.

The bind agent is used to monitor the status of persistent connections (509), and can be implemented as a configurable software module or deployed standalone or as part of an enterprise application. The bind agent can run on a standalone bind agent server, on the monitoring server, or on any other server that is in communication with the monitoring server and the VVM notification servers. The bind agent includes or is in communication with a memory (506) for storing configuration data including information about each VVM notification server and each VMSP whose connection status the bind agent is designed to monitor.

In particular, the bind agent stores in a database a URL, address, or other unique identifier for each VVM notification server the bind agent is designed to monitor. The same or another database accessible to the bind agent (e.g., a monitoring configuration database) stores the URL, address, or other unique identifier including for example a service URL for a notification probe running on each of the VVM notification servers. Other parameters for each VVM notification server can also be included in the monitoring configuration database, such as a time period at which the notification server should be monitored, a priority order for the notification server, a current (and a maximum allowed) number of connections supported by the notification server, and/or indicators for the server being active/inactive or in standby mode. The bind agent further stores in a database (e.g., the monitoring configuration database, or another database) a system ID or other unique identifier for each VMSP the bind agent is designed to monitor. In an example, the bind agent has access to a unified database having all of the above information. The database may also include information on planned or scheduled server outages, and additional attributes of the VVM notification server or VMSP used by the bind agent in monitoring (e.g., a priority order of the VVM notification servers, or an indication that a server is running in standby mode). The database(s) can be updated at any time by a system administrator or by an automated system.

For example, for each VVM notification server entry in the database, the database can include both the service URL of the associated notification probe, an indicator bit indicating whether the URL is active, inactive, or in standby, and a priority order of the server (e.g., by including a high priority flag, or a numerical ordering of servers according to priority). The bind agent can then more efficiently monitor the connections of the VVM notification servers by preferentially monitoring servers having higher priority orders (e.g., by monitoring higher priority servers before lower priority servers, and/or by monitoring higher priority servers more often than lower priority servers), and by not monitoring servers that are indicated as being inactive (e.g., servers that have a scheduled outage) or in standby mode (e.g., backup servers present to meet periods of peek demand). The bind agent can further preferentially monitor VVM notification servers which have larger numbers of connections with VMSPs (e.g., the bind agent stores in a database the number of connections supported by each notification server during a first monitoring of the notification servers, and uses the stored numbers of connections to prioritize the monitoring of notification servers having large numbers of connections during further monitoring of the servers). In addition, the database storing system IDs for each VMSP can include indicators for indicating whether any VMSPs are inactive or in standby, the indicators being used by the bind agent to temporarily disable monitoring of inactive VMSPs (e.g. while the VMSPs indicated as inactive are undergoing scheduled outages).

Figure 6:
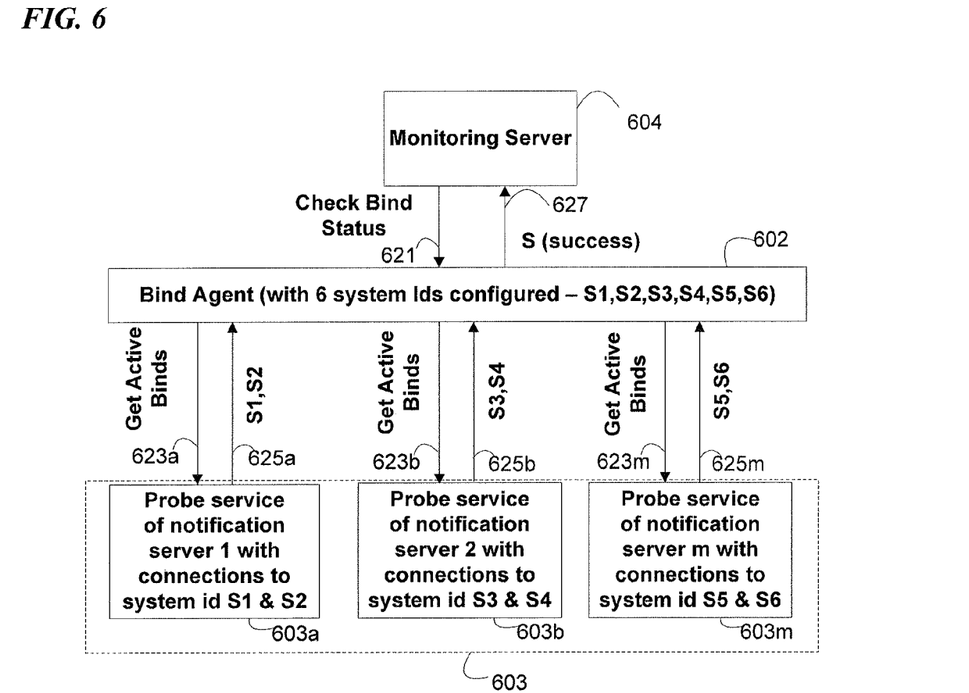
FIGS. 6 and 7 are diagrams showing signal flow between a monitoring server, a bind agent, and notification servers during the monitoring of persistent connection status between the notification servers and voicemail system platforms.
Figure 7:
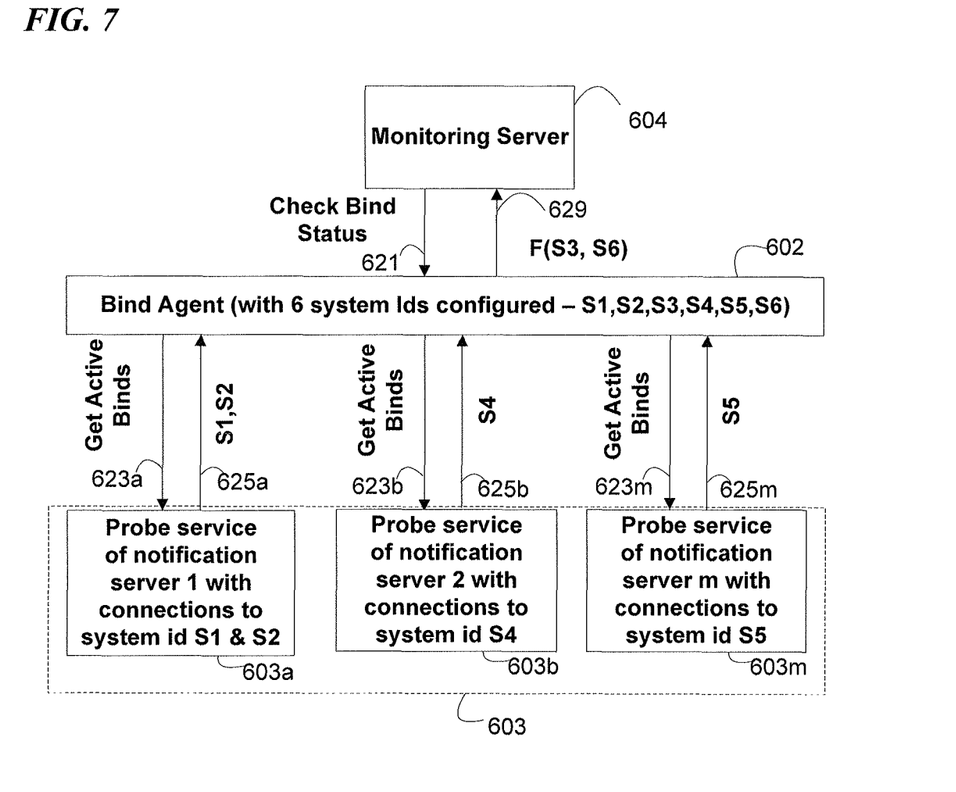

FIGS. 6 and 7 are flow diagrams showing signal flow between a monitoring server (604), a bind agent (602), and probe services (603) of respective notification servers during monitoring of persistent connection status between the notification servers and VMSPs. While FIGS. 6 and 7 show configurations having three notification servers and six VMSPs having system IDs S1-S6, the system and method can also be implemented in configurations having any number of notification servers and any number of VMSPs as exemplary clients. Indeed, in a typical large-scale voicemail implementation, as many as sixty or more VMSPs functioning as a distributed voicemail platform and around nine notification servers functioning as a distributed server can be used together. Other numbers of VMSPs and notification servers can also be used. Generally, the number of VMSPs is dependent on the number of subscribers of the service provider having voicemail boxes, while the number of VVM notification servers is dependent on the number of subscribers having VVM services. In addition, large-scale implementations can include additional servers (especially notification servers) running in standby mode. The standby servers can be included in the monitoring or, to reduce the numbers of servers monitored, excluded from monitoring until the standby servers enter active mode.

To initiate an operation for monitoring of persistent connections, the monitoring server (604) transmits a bind status check message (621) to the bind agent (602) to begin a connection status check. In one example, the monitoring server (604) transmits the bind status check message (621) periodically on a fixed time period (e.g., at 5 minute or other set time intervals) or on an adjustably variable time period (e.g., at a time period which is automatically reduced when one or more VVM notification server(s) or voicemail system platform(s) are not responding to queries from the bind agent or are otherwise not operational; or at a time period which is automatically increased when high volumes are VVM notifications are being communicated between the VMSPs and VVM notification servers; or at a period which is adjusted based on the priority of the monitored server or platform). Alternatively or additionally, the monitoring server (604) may transmit a bind status request message in response to a request (e.g., a request from a system administrator), or in response to an event or other activity detected in the network (e.g., in response to a VVM notification server (503) detecting a lost connection to a VMSP (501) and notifying the monitoring server (604) of the lost connection, or in response to the monitoring server (604) or bind agent (602) detecting that changes have been made in the monitoring configuration database). In another example, the monitoring server can transmit the bind status check message in response to detecting an event such as a VVM notification server being scheduled to be taken down for maintenance, for example, to verify that no VMSP will be without active connections after the VVM notification server is taken down.

In some examples, the bind status check message identifies particular VVM notification servers or particular VMSPs whose connections should be monitored (e.g., identifying high priority servers), and as a result the status of the identified servers is monitored. In general, however, the bind status check message does not identify particular servers, and the status of all servers identified in the bind agent memory (506) is monitored in response to the status check message.

Upon receiving the bind status check message, the bind agent (602) begins monitoring by retrieving from the bind agent memory (506) a list of the unique identifiers of each VVM notification server the bind agent is designed to monitor. Using the unique identifier of each VVM notification server, the bind agent communicates (623) with probe services (603a, 603b, 603m) running on the various respective VVM notification servers. For example, the bind agent initiates communication with regard to one of the servers by loading a probe service URL into cache and transmitting to the probe service URL a "Get Active Binds" request message (623a, 623b, 623m). The bind agent can sequentially communicate with each probe service, for example by following the order in which probe service identifiers are stored in memory, or by following a decreasing priority order of the VVM notification servers associated with the probe services, or by following another appropriate order. The bind agent may alternatively concurrently communicate with multiple probe services. In one example, the bind agent sequentially communicates with each probe service by transmitting a "Get Active Binds" request message to a first probe service, waiting for a response from the first probe service and, once either a response is received or a predefined timeout response time after sending the request message is reached, transmitting a "Get Active Binds" request message to a next probe service. In cases in which a VVM notification server is subject to an unplanned outage, the bind agent generally will not receive a response message from the probe service associated with the server subject to the outage, or the bind agent will receive an invalid response. In cases in which the bind agent detects that data for a particular VVM notification server has been changed in the monitoring configuration database (e.g., the priority of the particular VVM notification server has been increased, or a new service probe URL has been provided), the bind agent may automatically send a "Get Active Binds" request message to the particular notification server in response to detecting the change.

Each probe service (603a, 603b, 603m) running on a respective VVM notification server (e.g., notification servers 303a, 303b, and 303m) monitors the status of persistent connections involving the respective VVM notification server. The probe service may continuously monitor the persistent connections, periodically monitor the connections, or may monitor the connections in response to receiving a request from the bind agent. In response to receiving a "Get Active Binds" request (623a, 623b, 623m) from the bind agent (602), the probe service (603a, 603b, 603m) transmits to the bind agent a response message (625a, 625b, 625m) including a list of the VMSP system IDs with which the respective VVM notification server (e.g., notification servers 303a, 303b, or 303m) has active connections.

After receiving response messages (625a, 625b, 625m) from the probe services running on respective VVM notification servers, the bind agent (602) assembles a list of all VMSP system IDs received from the probe services in order to identify a connection fault between one or more client voicemail platforms and one or more notification servers. If the bind agent does not receive a response message from one or more of the VVM notification servers (e.g., if the bind agent does not receive a response message from a VVM notification server within a predefined timeout response time after sending out the "Get Active Binds" request message), the bind agent assembles a list of all VMSP system IDs received from the probe services from which response messages were received. To identify the connection fault, the bind agent further retrieves from its database a list of all system IDs for VMSPs the bind agent is designed to monitor, and compares the assembled list to the retrieved list to identify one or more VMSPs that do not have at least one active connection with a VVM notification server. To identify the connection fault, the bind agent can alternatively or additionally assemble a second list of all active connections between VMSPs and VVM notification servers, retrieve from its database a second list of VMSPs expected to have active connections with VVM notification servers, and compare the assembled second list to the retrieved second list to identify one or more expected connections of VMSPs to VVM notification servers that are not active. If no VMSPs are identified, as shown in FIG. 6, the bind agent generates and transmits to the monitoring server a bind status response message indicating success (S) (627). However, if any VMSPs are identified, as shown in FIG. 7, the bind agent generates and transmits to the monitoring server a bind status response message indicating failure (F) and identifying the one or more VMSPs not having at least one active connection with a VVM notification server (629).

In response to receiving a bind status response message indicating failure (F) (629), the monitoring server may issue an alert to a dashboard (not shown) monitored by a system administrator. The alert identifies the one or more VMSPs not having at least one active connection. Alternatively, the monitoring server may automatically cause the VMSPs not having at least one active connection to establish a connection with a VVM notification server by establishing a connection with the VMSPs and transmitting a command to the VMSPs to establish a connection. To establish a connection with a VVM notification server, a VMSP transmits a connection request to a load balancer application running on a server. The load balancer maintains a table indicating, for each VVM notification server, the IP address and port number(s) of the server, the number of current connections to the server, and the maximum number of connections the server can support. In response to the connection request received from the VMSP, the load balancer determines which VVM notification server the VMSP should connect to using a server selection criterion (e.g., a criterion such as balancing the load across all active notification servers, or ensuring that notification server are not overloaded), and transmits a response message to the VMSP indicating a particular VVM notification server for the VMSP. In one example, the load balancer is in communication with the monitoring server and/or the bind agent, and shares information on planned and unplanned VVM notification server outages with the monitoring server and/or the bind agent.

As described above, the monitoring system for identifying clients not having at least one active connection can advantageously be used for monitoring any type of client/server connection status, and for monitoring links using any type of protocol. By monitoring, the system can accelerate the process of identifying a client server not having an active connection, which facilitates manual or automatic corrective action and thereby may help reduce outage time and reduce network failures resulting from dropped client-server connections.

While the monitoring of persistent connections has been described herein in relation to an exemplary monitoring application in a VVM system, the systems and methods can also be used for monitoring of connections in a various other applications. Persistent client/server connections are used in numerous enterprise solutions to reduce the latency of communications, to improve the performance of the enterprise solutions, and to improve user experience. In particular, persistent connections are well suited in enterprise solutions where client and server status updates are automated and no user interaction is required. Because of the performance and reliability requirements of these applications, the systems and methods presented herein to monitor connections may be particularly advantageous. Some examples of applications in which persistent client/server connection are often used, and/ or in which monitoring of connection status by a bind agent can be used, include the following: dashboard applications in which status updates are automatically communicated, and in which the dashboard application acts as client or server to pull or push status updates instantly over persistent connections; applications involving real-time rating systems or real-time payment systems, in which end users can be notified of their balance (data, money . . . etc) in near real-time by enterprise applications using persistent connection; and banking applications where applications are distributed and require near real-time updates between clients and servers.

As shown by the above discussion, functions relating to the monitoring of persistent connection status may be implemented on computers connected for data communication via the components of a packet data network, operating as a monitoring server, a bind agent, and/or a notification server as shown in FIG. 5. Although special purpose devices may be used, such devices also may be implemented using one or more hardware platforms intended to represent a general class of data processing device commonly used to run "client" and/or "server" programming so as to implement the persistent connection status monitoring functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the monitoring of persistent client connection status. The software code is executable by the general-purpose computer that functions as the monitoring server, bind agent, notification server, voicemail system platform server and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for monitoring persistent connection status in essentially the manner performed in the implementations discussed and illustrated herein.

Figures 8, 9:
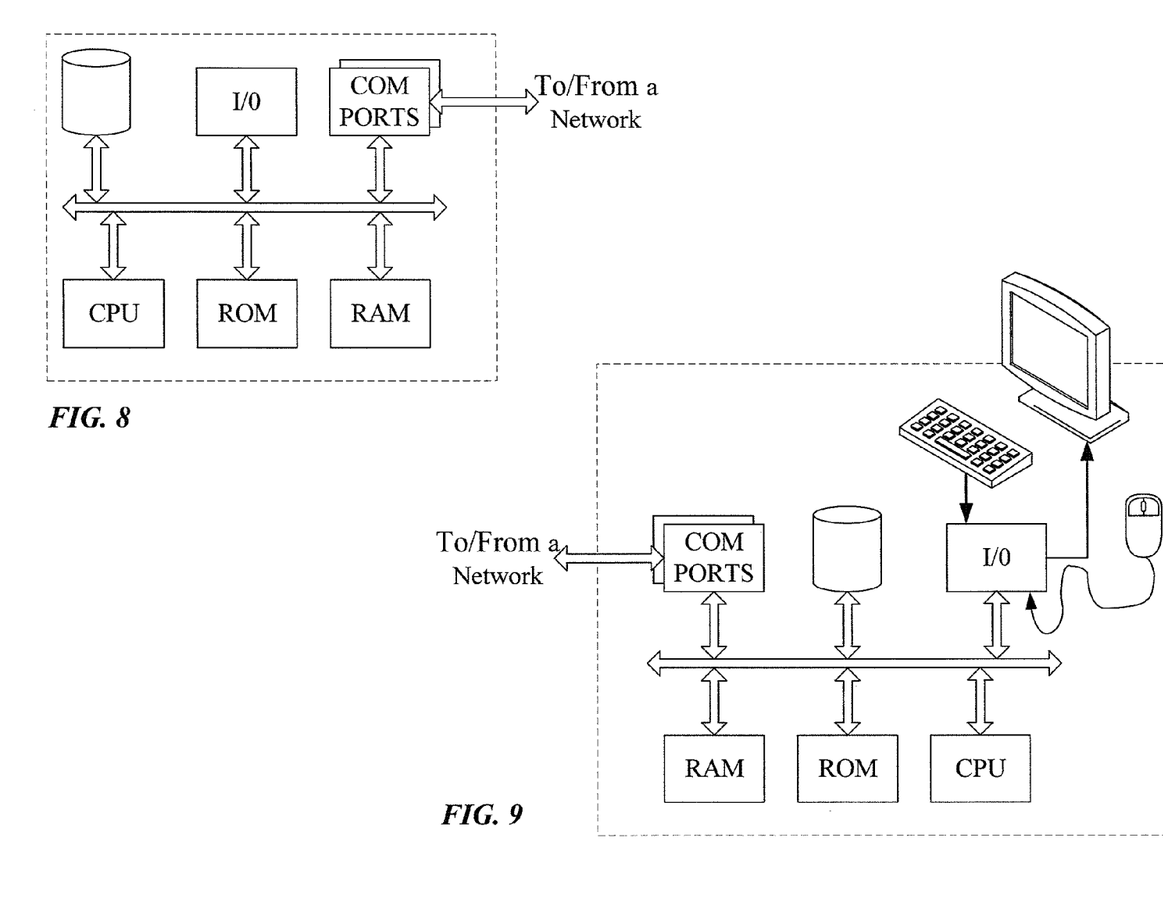
FIG. 8 is a simplified functional block diagram of a computer that may be configured as a host or server, for example, to function as the monitoring server, bind agent, or visual voicemail notification server in the system of FIG. 5.
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server such as a notification server or a monitoring server. FIG. 9 depicts a computer with user interface elements, as may be used to implement a personal computer or other type of work station or terminal device, although the computer of FIG. 9 may also act as a server if appropriately programmed. For other processes, these same hardware platforms may be configured as "clients", e.g., as a voicemail system platform. It is believed that those skilled in the art are familiar with the structure, programming and general operation of such computer equipment and as a result the drawings should be self-explanatory.

A computer operating as one of the servers or as a client voicemail system platform, for example, includes a data communication interface for packet data communication. The computer also includes a central processing unit (CPU), in the form of one or more processors, for executing program instructions. The computer typically includes an internal communication bus, program storage and data storage for various data files to be processed and/or communicated by the server or client platform, although the computer often receives programming and data via network communications. The hardware elements, operating systems and programming languages of such computers are conventional in nature, and it is presumed that those skilled in the art are adequately familiar therewith. Of course, the various functions or other types of devices may be implemented in a distributed fashion on a number of similar computers, to distribute the processing load.

Hence, aspects of the methods of monitoring persistent connection status outlined above may be embodied in programming. Program aspects of the technology may be thought of as "products" or "articles of manufacture" typically in the form of executable code and/or associated data that is carried on or embodied in a non-transitory or other type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the server running the bind agent or the notification server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the memory of the bind agent, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

CD-ROM: Compact disc read-only-memory
CPU: Central processing unit
DVD: Digital video disc
DVD-ROM: Digital video disc read-only memory
EPROM: Erasable programmable read-only memory
EMS: Enhanced messaging service
HTTP: Hypertext transfer protocol
ID: Identification
IP: Internet protocol
IR: Infrared
MMS: Multimedia messaging service
PC: Personal computer
PROM: Programmable read-only memory
RAM: Random access memory
RF: Radio frequency
ROM: Read-only memory
SMPP: Short message point-to-point
SMS: Short messaging service
TCP: Transmission control protocol
URL: Universal resource locator
VMS: Voicemail system
VMSP: Voicemail system platform
VVM: Visual voicemail

What is claimed is:

1. A visual voicemail system, comprising:
a plurality of voicemail platforms receiving and storing voicemail messages for mobile station users, each voicemail platform having an assigned unique system identifier;
a plurality of notification servers receiving notifications regarding the voicemail messages stored in the voicemail platforms, and in response, generating and sending mobile messaging service messages through a mobile communication network to mobile stations notifying the mobile station users about the stored voicemail messages, the voicemail platforms functioning as clients with respect to the notification servers, communication of the notifications from the voicemail platforms to the notification servers using a persistent packet communication connection between each voicemail platform and at least one of the notification servers; and
a bind agent in communication with the plurality of notification servers, the bind agent configured to:
  (a) request each notification server to identify associated voicemail platforms among the plurality of voicemail platforms with which the respective notification server has active connections and receive, from each notification server, corresponding system identifiers of the associated voicemail platforms with which the respective notification server has the active connections; and
  (b) based on the system identifiers received from each notification server, identify a connection fault between at least one of the voicemail platforms and at least one of the notification servers.

2. The system of claim 1, wherein the bind agent identifies the connection fault by identifying one or more of the voicemail platforms not having at least one active connection with any of the notification servers.

3. The system of claim 1, wherein the bind agent identifies the connection fault by comparing the received system identifiers to identifiers of respective voicemail platforms expected to have active connections with the notification servers, to identify one or more expected connections of the respective voicemail platforms to the notification servers that are not active.

4. The system of claim 1, further comprising a monitoring server, wherein the bind agent is configured to perform functions (a) and (b) in response to a call from the monitoring server.

5. The system of claim 4, wherein:
the monitoring server periodically issues the call to the bind agent to perform functions (a) and (b), and
the monitoring server issues a further call to the bind agent to perform functions (a) and (b) in response to detecting an event in at least one of the notification servers.

6. The system of claim 1, further comprising:
a plurality of probe services, each probe service running on one respective server of the plurality of notification servers, each probe service monitoring a status of connections between the one respective server and the associated voicemail platforms and providing, to the bind agent, the system identifiers for the associated voicemail platforms with which the one respective server has the active connections,
wherein the bind agent requests each respective notification server to identify the associated voicemail platforms with which the respective notification server has the active connections by sending a call to the probe service running on the respective notification server.

7. The system of claim 6, the system further comprising:
a memory in communication with the bind agent, the memory storing addresses for the plurality of probe services and storing a list of identifiers for the voicemail platforms.

8. The system of claim 7, wherein:
the bind agent requests each respective notification server to identify the associated voicemail platforms with which the respective notification server has the active connections by retrieving from the memory the address for the probe service running on each respective notification server, and transmitting, to the address for each probe service identified in the memory, a request to identify the associated voicemail platforms with which the respective notification server has the active connections; and
the bind agent identifies the connection fault between the at least one of the voicemail platforms and the at least one of the notification servers based on the list of identifiers for voicemail platforms stored in the memory.

9. The system of claim 7, wherein the memory stores at least one of a monitoring time period for the notification servers, a priority order for the notification servers, a current number of connections for each notification server, a maximum number of allowed connections for each notification server, an activity status for the notification servers, a list of scheduled server outages for the notification servers or an activity status for the voicemail platforms.

10. The system of claim 1, wherein the bind agent sends a request to each of the notification servers to identify the respective associated voicemail platforms based on at least one of a priority order of the notification servers or a number of connections associated with each notification server.

11. The system of claim 1, wherein the bind agent sends a request to each of the notification servers to identify the respective associated voicemail platforms based on a predetermined monitoring period associated with each notification server.

12. The system of claim 1, wherein the bind agent does not monitor at least one of notification servers or voicemail platforms that are inactive or in a standby mode.

13. The system of claim 1, wherein:
the active connections between each notification server and the associated voicemail platforms are persistent connections; and
the notification servers are part of a distributed server environment.

14. A method comprising:
requesting, by a bind agent, each of a plurality of notification servers to identify associated voicemail platforms among a plurality of voicemail platforms with which the respective notification server has active connections, the plurality of voicemail platforms storing voicemail messages for mobile station users, each voicemail platform having an assigned unique system identifier, the voicemail platforms functioning as clients with respect to the notification servers;
receiving, from each notification server, corresponding system identifiers of the associated voicemail platforms with which the respective notification server has the active connections; and
identifying, by the bind agent, a connection fault between at least one of the voicemail platforms and at least one of the notification servers, based on the system identifiers received from each notification server,
wherein mobile messaging service messages are generated and sent, by the plurality of notification servers, through a mobile communication network to mobile stations notifying the mobile station users about the stored voicemail messages, responsive to notifications regarding the voicemail messages stored in the voicemail platforms, and communication of the notifications from the voicemail platforms to the notification servers uses a persistent packet communication connection between each voicemail platform and at least one of the notification servers.

15. The method of claim 14, wherein the identifying of the connection fault includes identifying one or more of the voicemail platforms not having at least one active connection with any of the notification servers.

16. The method of claim 14, the method including:
periodically receiving a call from a monitoring server to identify any connection faults by the bind agent; and
receiving a further call from the monitoring server to identify any connection faults by the bind agent in response to detecting an event in at least one of the notification servers,
wherein, the steps of requesting, receiving the corresponding system identifiers and identifying are performed by the bind agent responsive to the call and the further call.

17. The method of claim 14, wherein the requesting of each of the plurality of notification servers to identify the associated voicemail platforms includes sending a request to each of the notification servers to identify the respective associated voicemail platforms based on at least one of a priority order of the notification servers or a number of connections associated with each notification server.

18. The method of claim 14, wherein the requesting of each of the plurality of notification servers to identify the associated voicemail platforms includes sending a request to each of the notification servers to identify the respective associated voicemail platforms based on a predetermined monitoring period associated with each notification server.

19. The method of claim 14, wherein the requesting of each of the plurality of notification servers to identify the associated voicemail platforms includes disabling monitoring, by the bind agent, of at least one of notification servers or voicemail platforms that are inactive or in a standby mode.

20. A computer program product, comprising at least one non-transitory machine readable medium and executable code embedded in the at least one non-transitory machine readable medium, wherein execution of the executable code by at least one programmable processor of a visual voicemail system causes the visual voicemail system to perform functions, including functions to:
request, by a bind agent, each of a plurality of notification servers to identify associated voicemail platforms among a plurality of voicemail platforms with which the respective notification server has active connections, the plurality of voicemail platforms storing voicemail messages for mobile station users, each voicemail platform having an assigned unique system identifier, the voicemail platforms functioning as clients with respect to the notification servers;
receive, from each notification server, corresponding system identifiers of the associated voicemail platforms with which the respective notification server has the active connections; and
identify, by the bind agent, a connection fault between at least one of the voicemail platforms and at least one of the notification servers, based on the system identifiers received from each notification server,
wherein mobile messaging service messages are generated and sent, by the plurality of notification servers, through a mobile communication network to mobile stations notifying the mobile station users about the stored voicemail messages, responsive to notifications regarding the voicemail messages stored in the voicemail platforms, and
communication of the notifications from the voicemail platforms to the notification servers uses a persistent packet communication connection between each voicemail platform and at least one of the notification servers.

\* \* \* \* \*